J. C. SPARKS.
Carriage Wheel.
No. 75,213.
Patented March 3, 1868.
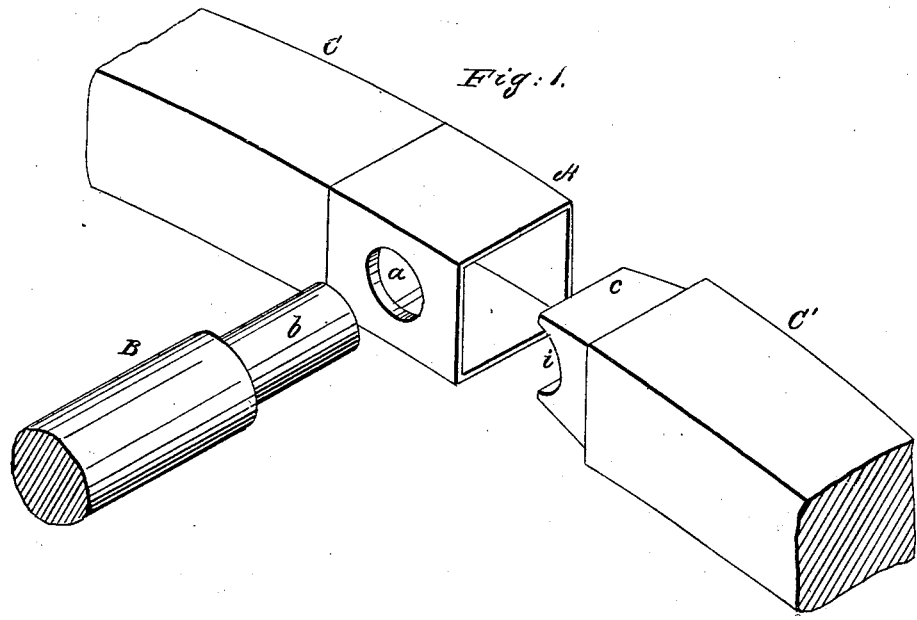
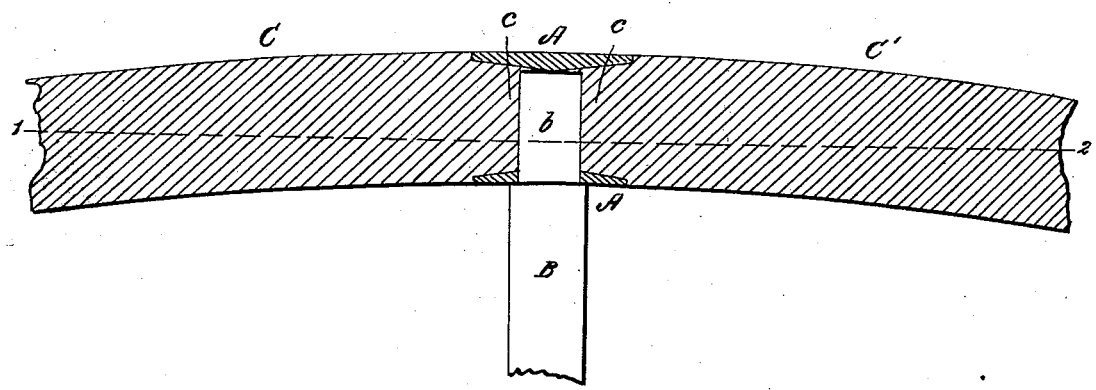
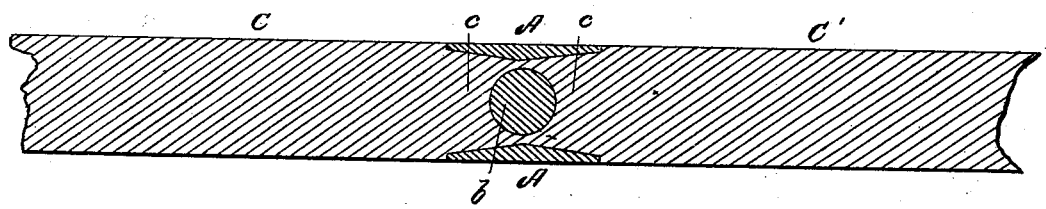
Witnesses:
Wm. Albert Steel.
Thos. Rowbotham.
Inventor:
J. C. Sparks.
By his Attorney.
H. Howson.

United States Patent Office.

J. C. SPARKS, OF PHILADELPHIA, PENNSYLVANIA, ASSIGNOR TO HIMSELF AND A. G. BUZBY, OF SAME PLACE.

Letters Patent No. 75,213, dated March 3, 1868.

IMPROVED CARRIAGE-WHEEL.

*The Schedule referred to in these Letters Patent and making part of the same.*

TO ALL WHOM IT MAY CONCERN:

Be it known that I, J. C. SPARKS, of Philadelphia, Pennsylvania, have invented an Improvement in Wheels for Carriages, &c.; and I do hereby declare the following to be a full, clear, and exact description of the same.

My invention consists of a ferrule of malleable iron, adapted for the reception of a tenon on one of the spokes of a wheel, and of projections on the adjacent ends of the felloes, and the inner sides of which are inclined, as fully described hereafter, so that the said felloes may be securely fastened to each other and to the spoke, while the liability of the ferrule to become loosened is prevented.

In order to enable others skilled in the art to make my invention, I will now proceed to describe the construction of the same, reference being had to the accompanying drawing, which forms a part of this specification, and in which—

Figure 1 is a perspective view of sufficient of a carriage-wheel to show my improvement.

Figure 2, a sectional view; and

Figure 3, a section on the line 1-2, fig. 2.

A is a square ferrule of malleable iron, the inner sides of which are inclined, as shown in the drawing, so that the internal diameter of the ferrule is greater at the ends than at the centre, and in one side of the ferrule is an opening, $a$, adapted for the reception of a tenon, $b$, on one of the spokes B of a wheel. On the adjacent ends of the felloes C C' of the wheel are projections $c\ c$, in the end of each of which is a recess, $i$, adapted for the reception of a part of the tenon $b$, the said projections $c$ being of such a size that they may be forced into the open ends of the ferrule. The felloes are placed upon the spokes of the wheel, (except at the joints where they meet the spoke B,) in the usual manner. The ferrule A is then adjusted so that the projections $c\ c$ extend into the open ends of the same, and the end of the tenon $b$ projects into the opening $a$. The ferrule is then driven towards the spoke until the end of the tenon strikes the inner side of the ferrule, and the ends of the projections $c\ c$ meet on opposite sides of the tenon and enclose the latter, as shown in figs. 2 and 3. The opposite ends of the felloes are then connected in a like manner, and the tire is shrunk round the felloes as usual.

I am aware that a ferrule having its inner sides so inclined as to form two tapering sockets has been heretofore used, the joint in this case, however, being between the spokes of the wheel. It will be seen that in the above-described arrangement, the ferrule is adapted for the reception of a tenon on one of the spokes, and has also inclined sockets for the reception of projections on the felloes, so that the ends of the said projections, which are recessed to admit tenon, are compressed on and grasp the latter, and form a firm, secure joint at the point where the wheel is generally the weakest. Without claiming broadly a ferrule with tapering sockets,

I claim as my invention, and desire to secure by Letters Patent—

The arrangement of the ferrule A, having tapering sockets as described, the felloes C C', and spoke B, when projections on the said felloes are recessed for the reception of a tenon on the spoke, which projects through the side of and into the ferrule, all as set forth.

In testimony whereof, I have signed my name to this specification in the presence of two subscribing witnesses.

J. C. SPARKS.

Witnesses:
 JOHN WHITE,
 ISAIAH D. BUTLER.